United States Patent
Freeny, Jr.

(10) Patent No.: US 6,513,016 B1
(45) Date of Patent: Jan. 28, 2003

(54) AUTOMATED SYNCHRONOUS PRODUCT PRICING AND ADVERTISING SYSTEM

(75) Inventor: Charles C. Freeny, Jr., Dallas, TX (US)

(73) Assignee: Automated Business Companies, Irving, TX (US)

( * ) Notice: Subject to any disclaimer, the term of this patent is extended or adjusted under 35 U.S.C. 154(b) by 0 days.

(21) Appl. No.: 09/487,422

(22) Filed: Jan. 20, 2000

Related U.S. Application Data (63) Continuation of application No. 09/110,624, filed on Jul. 6, 1998.

(51) Int. Cl.$^7$ .............................................. G06F 17/60
(52) U.S. Cl. .............................. 705/26; 705/14; 705/16; 705/21; 705/22; 705/24
(58) Field of Search .............................. 705/14, 16, 20, 705/21, 22, 26

(56) References Cited

U.S. PATENT DOCUMENTS

| | | |
|---|---|---|
| 4,500,880 A | 2/1985 | Gomersall et al. .......... 340/825 |
| 4,992,940 A | 2/1991 | Dworkin ..................... 364/401 |
| 5,172,314 A | 12/1992 | Poland et al. ............... 364/401 |
| 5,192,854 A | 3/1993 | Counts ....................... 235/375 |
| 5,339,250 A * | 8/1994 | Durbin ....................... 364/479 |
| 5,353,218 A | 10/1994 | De Lapa et al. ............ 364/401 |
| RE34,915 E | 4/1995 | Nichtberger et al. ........ 364/401 |
| 5,420,606 A | 5/1995 | Begum et al. ............... 345/156 |
| 5,442,343 A | 8/1995 | Cato et al. .................. 340/825 |
| 5,465,085 A | 11/1995 | Caldwell et al. ............ 340/825 |
| 5,467,474 A | 11/1995 | Ackerman et al. .......... 395/800 |
| 5,483,049 A | 1/1996 | Schulze, Jr. ................ 235/383 |
| 5,539,393 A | 7/1996 | Barfod ....................... 340/825 |
| 5,544,041 A | 8/1996 | Nekomoto ............. 364/401 R |
| 5,557,721 A | 9/1996 | Fite et al. ................... 395/148 |
| 5,572,653 A | 11/1996 | DeTemple et al. .......... 395/501 |
| 5,612,868 A | 3/1997 | Off et al. .................... 364/214 |
| 5,873,069 A * | 2/1999 | Reuhl et al. ................. 705/20 |
| 6,076,071 A * | 6/2000 | Freeny, Jr. .................. 705/26 |

FOREIGN PATENT DOCUMENTS

| | | |
|---|---|---|
| EP | 0708409 | 4/1996 |
| EP | 0887757 | 12/1998 |
| WO | 9014630 | 11/1990 |
| WO | 9304449 | 3/1993 |
| WO | 9723838 | 7/1997 |

OTHER PUBLICATIONS

Gupta, A. et al.; Managing computing resources in intranets: an electronic commerce perspective, Decision Support Systems, Elsevier, V24, n1. (Abstract).*
Grocer, UK: Electronic Shelf Labelling for supermarkets?, Jul. 13, 1996; p12, Abstract.*
Kirkby, P; Business Models and Systems architectures for future QoS guaranteed Internet services; at IEE Colloquium on Charging for ATM, Nov. 2098, 116p, Abstract.*
US: More Supermarket Customers are Hurried Men; Supermarketing; Jun. 26, 1998; p12.*
Growing use of self–Scanning Chackouts, Super Marketing, Oct. 9, 1992, p18–19.*

* cited by examiner

Primary Examiner—Vincent Millin
Assistant Examiner—Pedro R. Kanof
(74) Attorney, Agent, or Firm—Dunlap Codding & Rogers (57) ABSTRACT

An automated product pricing system including a physical store system, a virtual store system, and a control system. The physical and virtual store systems are capable of transmitting sales data indicative of the number of sales of identified respective products. The control system is adapted to receive the sales data from the physical store system and the virtual store system. In response thereto, the control system generates price change data including a changed price of an identified product based on the sales data received from at least one of the physical and virtual store systems. The price change data is then transmitted by the control system to at least one of the physical and virtual store systems to thereby change the price of the identified product.

14 Claims, 4 Drawing Sheets

AUTOMATED SYNCHRONOUS PRODUCT PRICING AND ADVERTISING SYSTEM

CROSS REFERENCE TO RELATED APPLICATIONS

This is a continuation of application Ser. No. 09/110,624, filed Jul. 6, 1998.

STATEMENT REGARDING FEDERALLY SPONSORED RESEARCH OR DEVELOPMENT

Not applicable.

BACKGROUND OF THE INVENTION

A number of methods are currently in use for the pricing and advertising of products. For example, manual placard displays are provided at locations where the product is shelved at the store to permit consumers to determine the price of the product. The placard displays must be manually changed each time that the prices in the checkout computers are changed so that there is no discrepancy between the prices contained in the checkout computer and the prices shown on the manual placard displays. However, due to accumulated errors, there can be a fairly large discrepancy between the prices contained in the checkout computer and the prices shown on the manual placard displays. This discrepancy is of increasing concern to governmental regulators.

Electronic pricing systems are also in existence. In the existing electronic pricing systems, each product carries a bar code. An electronic price display which displays the price of the product at a location where the product is shelved at the stores is provided. The store also has a checkout computer and scanner. In such existing electronic pricing systems, an individual with a hand held unit changes the product price at the display located where the product is shelved. The changed prices are entered into the hand held unit and the person positions the hand held unit near the electronic display and presses a button so that the information is transferred to the electronic display to display the new price.

There are also a number of systems available which interconnect local store computers to the checkout stations, as well as interconnecting local store computers to the owner computers. Companies, such as Intactix of Dallas, Tex., are suppliers of such software and the hardware is well-known to those skilled in the art. Methods also exist for connecting a local store computer to an owner computer. However, most of the current product pricing display change methods are manual as previously discussed. These methods are time consuming, and require costly generation and replacement of the pricing placards at the product stations.

A number of electronic display technologies are available today, such as liquid crystal displays, light emitting diode displays, flat panel video displays, audio convertors, etc. which may be utilized as product displays at the product station. For example, companies such as PRICER AB of Sweden and others are installing active product price units which can be controlled from the local store computer.

Since the internet explosion in 1995–96, a number of virtual store chains, such as Tom Thumb and Kroger have created virtual stores on the internet for home shopping and deliveries. Price synchronization for the virtual stores pose different problems from the physical stores.

With regard to advertising, a number of methods are currently in use for placing coupons in the hands of consumers. Three of such methods are:

1. Coupons are placed in the advertising section of periodicals or mailed directly to the consumer's house for later use in stores.
2. Books of coupons and coupon dispensing units are made available inside stores for later use during checkout.
3. Coupons are generated at the checkout station at the conclusion of the checkout process for later use by the consumer.

Once the consumer has presented a coupon to a checkout clerk, the coupons are either entered manually or scanned by automated scanners for checkout. The coupons must then be saved by the checkout clerk for later redemption at redemption centers so that the retail establishment can recover its cost from the product manufacturers which the store has, in effect, advanced to the consumer. The coupons must then be sorted by product and tabulated as to overall cost for various management reasons.

The current process for utilizing coupons typically proceeds as follows. The consumer hands a coupon to the checkout clerk. The product code on the coupon is scanned and the amount of the discount is looked up in the store computer. If the coupon and the discount amount have been both entered into the store computer, this amount is deducted from the normal product retail price. However, if the coupon has not been entered into the store computer, the discount amount must be manually entered.

Then, the coupon is set aside and saved for later sorting by another clerk. The amounts and product codes are accumulated and the coupons are later sent to a redemption center where they are again manually checked before a check or credit is issued to the retail store.

The current coupon handling methods are very time consuming.

With the present invention, the pricing of products is accomplished more efficiently than existing systems, and the manual handling of coupons at checkout locations is eliminated.

DETAILED DESCRIPTION OF THE INVENTION

Figure 1:
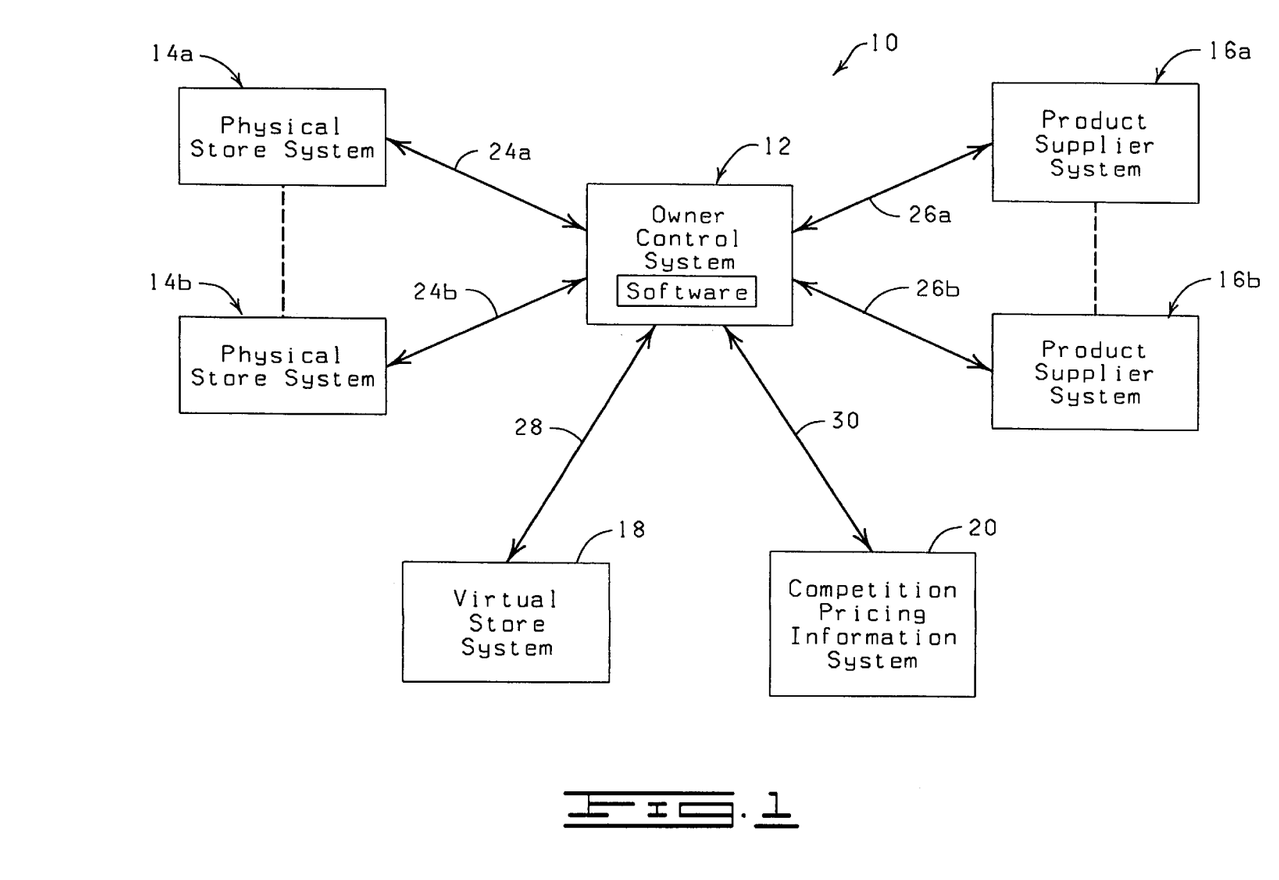
FIG. 1 is a schematic, diagrammatic view of an automated synchronous product pricing and advertising system constructed in accordance with the present invention.

Referring now to the drawings, and more particularly to FIG. 1, shown therein is an automated synchronous product pricing and advertising system 10 constructed in accordance with the present invention. Broadly, the automated synchronous product pricing and advertising system 10 includes an owner control system 12, a plurality of physical store systems 14, a plurality of product supplier systems 16, at least one virtual store system 18 and a competition pricing information system 20. Only two of the physical store systems 14, and product supplier systems 16 are shown in FIG. 1 for purposes of clarity. The respective physical store systems are designated in FIG. 1 by the general reference numerals 14a and 14b. The respective product supplier systems are designated in FIG. 1 by the general reference numerals 16a and 16b.

The owner control system 12 is adapted to communicate with the physical store systems 14a and 14b via respective signal paths 24a and 24b. The owner control system 12 also communicates with the product supplier systems 16a and 16b via respective signal paths 26a and 26b, the virtual store system 18 via a signal path 28 and the competition pricing information system 20 via a signal path 30.

It is envisioned that the physical store systems 14 be located in establishments having product locations, such as shelves, boxes, slots, areas, or the like for storage and/or sale of products. For example, the establishments in which the physical store systems 14 are located can be retail supermarkets, drug stores, home building supply stores, inventory stocking areas or assembly sites at manufacturing or distribution facilities.

It is envisioned that the product supplier systems 16 be located at establishments which serve to supply products to the stores where the physical store systems 14 are located or to a warehouse for distribution after an order is received by the virtual store system 18.

The competition pricing information system 20 can include a program for obtaining information from an internet search engine, such as YAHOO or EXCITE which look for the prices at which predetermined competitors are selling the same or similar products.

Signal paths 24, 26, 28 and 30 can be airway and/or cable communication links or any other suitable communication link.

The owner control system 12 is constructed to receive sales and inventory data from the physical store systems 14, and the virtual store system 18. The owner control system 12 is also constructed to receive pricing and advertising data from the product supplier systems 16 via the signal paths 26a and 26b, and competition price data from the competition pricing information system 20 via the signal path 30. As will be described in more detail hereinbelow, the owner control system 12 utilizes the sales and inventory data provided by the physical store systems 14, and the virtual store system 18, the pricing and advertising data provided by the product supplier systems 16, and the competition price data provided by the competition pricing information system 20 to automatically change product prices at the physical store systems 14 and the virtual store system 18, to automatically provide in-store advertising data within the physical store systems 14 and/or the virtual store system 18, and to automatically order products from the product suppliers associated with the product supplier systems 16.

Figure 2:
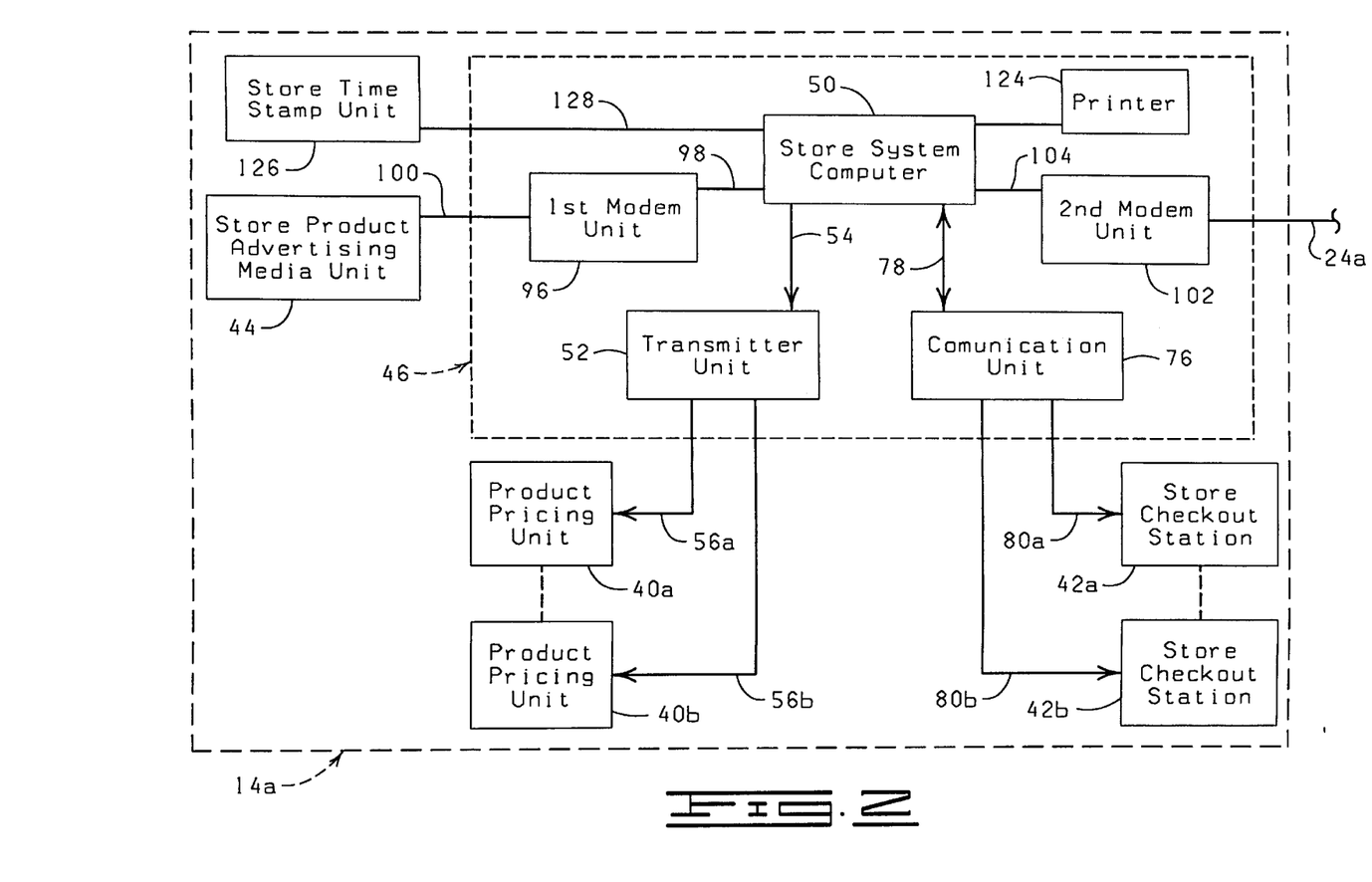
FIG. 2 is a schematic, diagrammatic view of a physical store system constructed in accordance with the present invention.

Referring now to FIG. 2, shown therein in more detail is the physical store system 14a. Because the physical store systems 14a and 14b are substantially identical in construction and function, only the physical store system 14a will be described in detail herein.

The physical store system 14a, in general, is constructed to display a product location price indicating the unit price of a product on at least one of a plurality of product pricing units 40, to request from a shopper a product checkout price for the purchase of the product by at least one of a plurality of store checkout stations 42, to selectively print coupons, transmit video and/or audio advertising messages including the product checkout price on a store product advertising media unit 44, and to dynamically change the displayed product location prices, the requested product checkout prices, the coupons and the advertising messages in real time based on predetermined criteria thereby substantially eliminating consumer confusion and yielding the maximum economic benefit for the physical store by a store product control system 46.

The individual products (not shown) in the store are stamped with a machine readable code, such as the UPC (universal product code) bar code. Each of the product pricing units 40 are located proximate to one of the individual products and has a unique electronic address identifying the particular product. The unique electronic address can be the universal product code.

The store product control system 46 includes a store system computer 50. The store system computer 50 has stored thereon the unique electronic addresses for the respective product pricing units 40. A product location price associated with each of the unique electronic addresses is stored in the store system computer 50. The product location price is indicative of the unit price of a single product.

The store system computer 50 is constructed to transmit the unique electronic addresses and the product location prices associated therewith ("electronic address and product location price data") to a transmitter unit 52 via a signal path 54. In response to receiving the electronic address and product location price data from the store system computer 50, the transmitter unit 52 transmits such electronic address and product location price data to the respective product pricing units 40a and 40b via signal paths 56a and 56b. The signal paths 56a and 56b can be hard wiring (copper wiring, fiber optics, coaxial cable, or the like), RF wireless (microwave, low frequency, satellite, or the like) and/or optical (laser, infrared, or the like).

Figures 3, 4:
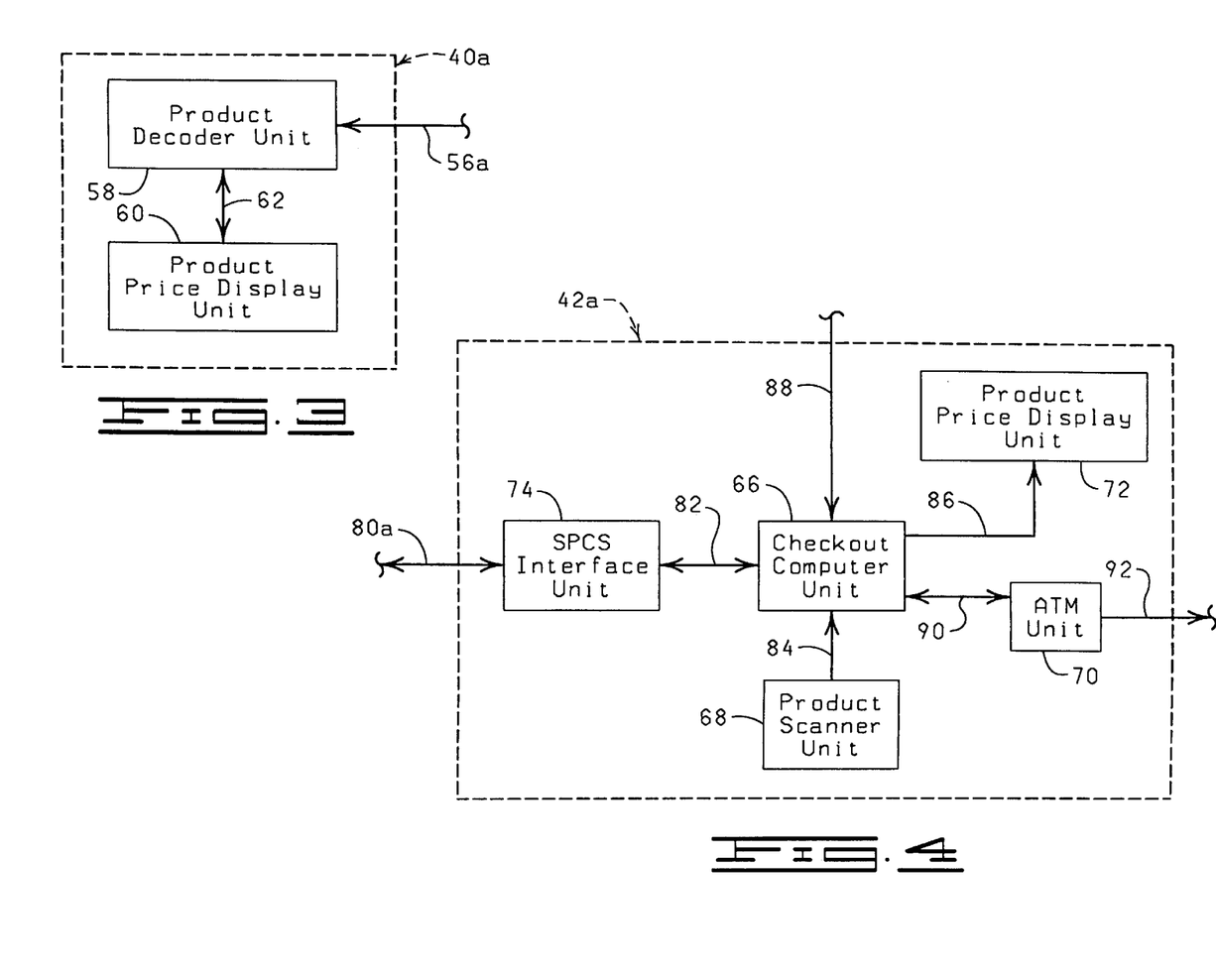
FIG. 3 is a schematic, diagrammatic view of a product pricing unit utilized in the physical store system depicted in FIG. 2.
FIG. 4 is a schematic, diagrammatic view of a product checkout station utilized in the physical store system depicted in FIG. 2.

Referring now to FIG. 2, in combination with FIG. 3, the electronic address and product location price data is received by a product decoder unit 58 included in each of the product pricing units 40. It should be understood that each of the product pricing units 40a and 40b are substantially identical in construction and function, and that only the product pricing unit 40a is shown in FIG. 3 for purposes of clarity. The product decoder unit 58 can be a 2.4 GHz spread spectrum RF receiver unit. The product decoder unit 58 has an electronic address stored therein. Upon receipt of the electronic address and product location price data from the store product control system 46, the product decoder unit 58 compares the received electronic address with that stored in the product decoder unit 58. When a match is found, the product location price data associated with the electronic address is sent to a product price display unit 60 via a signal path 62.

Upon receipt of the product location price data from the product decoder unit 58, the product price display unit 60 transmits and/or displays the product location price indicative of the unit price of a product disposed adjacent the particular product pricing unit 40 in a format perceivable by a shopper when the shopper is selecting the product for purchase. The product price display unit 60 can be a liquid crystal display, or a LED display, for example. The product location price transmitted or displayed by the product price display unit 60 remains until a new product location price for the particular product located adjacent the product pricing unit 40 is received by the product decoder unit 58. In practice, it is contemplated that to overcome inadvertent mistakes, all the electronic address and product location price data will be transmitted periodically from the store product control system 46 to the product pricing units 40 even though there may have not been any price changes.

In addition, it should be noted that the store product control system 46 has the ability to transmit, and the product pricing units 40 have the ability to receive a special code which changes both the electronic address for the particular product pricing units 40 and/or a price associated with the new electronic address. In this manner, the particular product pricing units 40 become universal.

The store checkout stations 42a and 42b are substantially identical in construction and function. For purposes of clarity, only the store checkout station 42a will be described in detail herein.

Referring now to FIG. 2 in combination with FIG. 4, the store checkout station 42a is shown in more detail. The store checkout station 42a includes a checkout computer unit 66. The checkout computer unit 66 has stored therein a product price table which includes a unique code for each of the products available for sale in the store, and a product checkout price associated with the unique code. The unique code for each of the products available for sale in the store can be the UPC (universal product code) code. The product checkout price stored in the checkout computer unit 66 and associated with a single unique code is the price requested from a shopper for the purchase of the product.

The store checkout station 42a is also provided with a product scanner unit 68, an ATM unit 70, a product price display unit 72 and an SPCS interface unit 74. In use, the store system computer 50 outputs product checkout price data to a communication unit 76 via a signal path 78. The communication unit 76 outputs the received product checkout pricing data to the store checkout stations 42a and 42b via signal paths 80a and 80b.

As best shown in FIG. 4, the SPCS interface unit 74 receives the transmitted product checkout price data from the communication unit 76. In response thereto, the SPCS interface unit 74 transmits the received product checkout price data to the checkout computer unit 66 via a signal path 82. In response to receiving the product checkout price data, the checkout computer unit 66 is constructed to build or update the product price table stored in the checkout computer unit 66.

In use, the shopper selects at least on product for purchase and perceives the product location price displayed by the product price display unit 60 of the product pricing unit 40a, for example. The shopper transports the products to the store checkout station 42a, for example. The UPC code on the product is scanned by the product scanner unit 68 and is thereby input into the checkout computer unit 66 via a signal path 84. The checkout computer unit 66 looks up the product checkout price stored in the product price table by the UPC or unique code identifying the particular product. The checkout computer unit 66 then outputs the product checkout price for the particular product to the product price display unit 72 via a signal path 86 so that the product checkout price for the particular product is perceivable by the shopper. The product checkout price stored in the product price table does not exceed the respective product location price perceivable by the shopper when the shopper was selecting the product for purchase, as will be explained in more detail hereinafter. In any event, once the product which the shopper is purchasing is scanned via the product scanner unit 68, the product checkout price is requested from the shopper for payment. The shopper can pay for the product in any suitable manner, such as by entering their credit card number into the checkout computer unit 66 via an input 88. The shopper's credit card number is then transmitted to a credit card source company for automated payment credit verification via the ATM unit 70 and signal paths 90 and 92.

The UPC or unique code identifying each product purchased is batched in the checkout computer unit 66 until the shopper's transaction is complete. At that time, the UPC or unique code data is transmitted to the store system computer 50 via the signal paths 78, 80a, and 82 so that the store system computer 50 can keep track of the store's inventory.

Store Product Advertising Media Unit 44

The store system computer 50 selectively outputs product advertising data including the unique codes identifying selected products within the store, and a product advertising price indicating an advertised price of the product associated with the unique code to a first modem unit 96 via a signal path 98. The first modem unit 96 receives the product advertising data, and in response thereto the first modem unit 96 outputs such product advertising data to the store product advertising media unit 44 via a signal path 100.

It should be noted that the product advertising data can either be generated by the store system computer 50, and/or can be received by the store system computer 50 from the owner control system 12 via the signal path 24a, a second modem unit 102, and a signal path 104. The store system computer 50 and/or the owner control system 12 are programmed so that upon the detection of an increased supply or decreased demand for a product or products, the product advertising data is automatically generated and transmitted to the store product advertising media unit 44 to increased the demand for a selected product or products.

Figure 5:
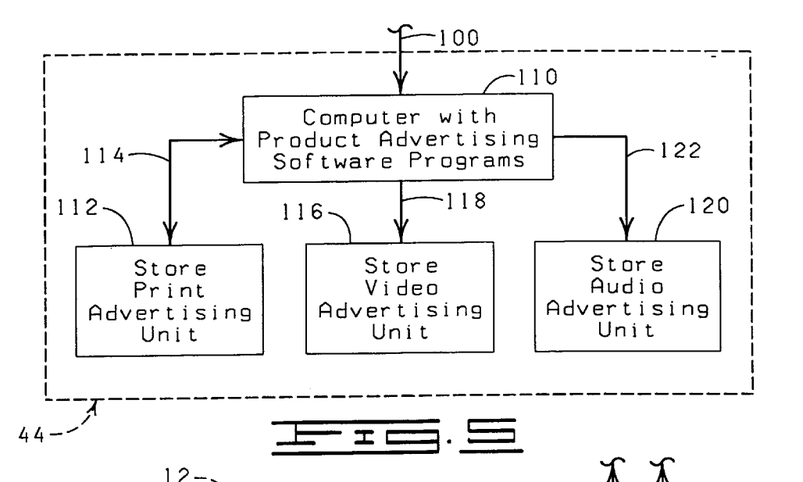
FIG. 5 is a schematic, diagrammatic view of a store product advertising media unit constructed in accordance with the present invention.

Referring now to FIG. 2 in combination with FIG. 5, the store product advertising media unit 44 is shown in more detail. The product advertising data transmitted from the first modem unit 96 is received by an advertising computer 110. The advertising computer 110 is loaded with software to cause the advertising computer 110 to selectively communicate with a store print advertising unit 112 via a signal path 114, a store video advertising unit 116 via a signal path 118, and a store audio advertising unit 120 via a signal path 122 to selectively make coupons available for printing, to transmit video messages and audio messages identifying products and product advertising prices indicative of the price to be charged for such products. Only one store print advertising unit 112, store video advertising unit 116 and store audio advertising unit 120 are shown in FIG. 5 for purposes of clarity. It should be understood that the store product advertising media unit 44 can include a plurality of store print advertising units 112, store video advertising units 116 and store audio advertising units 120. The store print advertising units 112, store video advertising units 116 and store audio advertising units 120 can be located proximate to respective individual products to provide the product advertising data (through coupons, video and/or audio messages) independently for each individual product, or can be located in a centralized location or locations within the store to provide product advertising data for more than one product at each store print advertising unit 112, store video advertising unit 116 and store audio advertising unit 120.

The store print advertising unit 112 may include an associated video screen and keypad (not shown) to permit shoppers to browse and select coupons to print. Upon demand, the store print advertising unit 112 prints a set of coupons (or at least one coupon) with each coupon identifying a predetermined price reduction for an identified product or service and also includes other information such as store location, appropriate graphics, colors, and/or a product bar code for checkout and expiration date.

The coupons generated by the store print advertising unit 112 are given by the shopper to a checkout clerk associated with one of the store checkout stations 42 when the shopper is ready to pay prior to leaving the store. The coupons are scanned by the product scanner unit 68 at the store checkout stations 42 to provide coupon data. The store checkout stations 42 transmit the coupon data received from the coupon, such as the identified product to the store system computer 50 via the signal paths 78 and 80. The store system computer 50 looks up the discount associated with the product bar code and transmits this discount to the particular one of the store checkout stations 42 from which the coupon was scanned for inclusion on the shopper's printed receipt.

If the coupon presented to the checkout clerk was not printed by the store print advertising unit 112, and product bar code identifying the coupon is not in storage, the store system computer 50 sends a message to the store checkout station 42 where the particular coupon was scanned and the clerk at the particular store checkout station 42 then manually enters the product number and discount. The store system computer 50 also checks to make sure that the product identified on the coupon has been scanned via the product scanner unit 68 before authorizing the checkout computer unit 66 at the store checkout stations 42 to deduct the discount amount from the requested product checkout price.

The coupon data, including the product code information, received from the store checkout stations 42 from the scanning of coupons is stored in the store system computer 50. Periodically, the store system computer 50 accumulates all of the coupon data which has been entered into the store system computer 50 and then sorts such coupon data by manufacturer, tabulates the discount amount by manufacturer and then sends all of the sorted and totaled coupon data to a printer 124 to generate a physical copy of the coupons and the sorted and accumulated total, if required by a redemption center. Because the coupon data is sorted, accumulated and printed, the physical coupons which were scanned by the product scanner unit 68 of the store checkout stations 42 can be discarded at the respective store checkout stations 42.

Store System Computer 50

As mentioned previously, the store system computer 50 receives unique code data identifying purchased products from the store checkout stations 42 via the signal paths 78 and 80. In response thereto, the store system computer 50 can change the prices in the store based on predetermined price change algorithms. The predetermined price change algorithms utilized to change the store prices can be either manager selectable or selectable via the owner control system 12.

One of the price change algorithms which the store system computer 50 has stored thereon is a program to detect the rate of purchase for each product and compare such rate with a predetermined limit. If the rate of purchase of the product exceeds the predetermined limit, the price of the product is increased automatically by a predetermined amount. If the rate of purchase of the product is below the predetermined limit, the price of the product is decreased automatically by a predetermined amount to stimulate demand.

Another price change algorithm which is stored on the store system computer 50 is a program to detect the amount of product remaining in inventory, or on the shelf. If the amount of product left on the shelf falls below a predetermined limit, then the store system computer 50 outputs a special signal such as a flashing screen or a printout on a special printer to notify the managers that the number of products on the shelf needs to be increased. Alternatively, or in addition, the store system computer 50 can automatically increase by a predetermined amount the price of the product based on the reduced supply of product on the shelf or in inventory.

The store system computer 50 can also have other predetermined price change algorithms thereon such as price change algorithms to automatically change prices to match competitor pricing specials, to reflect purchasing specials and/or to achieve end of the month sales projections.

When a product price change is made or received by the store system computer 50, it is important that the price change be implemented in a manner such that the product checkout price requested from the shopper for the purchase of the product at one of the store checkout stations 42 not exceed the product location price displayed by the product pricing unit 40 located proximate to the product so as to reduce consumer irritation with price discrepancies. As will be described hereinafter, the store system computer 50 is programmed to selectively change the product checkout price and product location price in three modes.

In the first mode, as shown in FIG. 2 the physical store systems 14 include a store time-stamp unit 126. Each of the physical store systems 14 can be provided with a single store time-stamp unit 126 provided near the entrance of the store, for example, and/or a plurality of store time-stamp units 126 provided adjacent respective product pricing units 40. The store time-stamp unit 126 communicates with the store system computer 50 via a signal path 128.

Each of the shoppers can be provided with some type of time-stampable media capable of communicating with the store time-stamp unit 126, such as a smart card, or a barcoded ticket. The store time-stamp unit 126 records, on the time-stampable media, a time stamp data indicative of the time at which the shopper was located adjacent the store time-stamp unit 126 to give an indication of the time at which the shopper perceived the product location price when the shopper was selecting the product for purchase.

When the store time-stamp unit 126 is provided adjacent the entrance of the store, each of the shoppers provides their time-stampable media to the store time-stamp unit 126 to record the time at which the shopper entered the store. When a plurality of store time-stamp units 126 are provided adjacent to the respective product pricing units 40, the shopper provides their time-stampable media to the store time-stamp unit 126 to record the approximate time at which the shopper selected the product for purchase.

For example, one embodiment of the present invention operates as follows. The store system computer 50 outputs a first product location price indicative of the unit price of a product to the product pricing units 40 via the signal paths 54 and 56. The product pricing units 40 receive the first product location price and display the first product location price on the product price display unit 60 such that the first product location price is perceivable by a first shopper when the first shopper is selecting the product for purchase. The store system computer 50, utilizing at least one of the price change algorithms, automatically changes the first product location price to a second product location price following the first shopper selecting the product for purchase and possibly while the first shopper is still in the store shopping. The second product location price is then transmitted to the product pricing units 40 via the signal paths 54 and 56 to be displayed on the product price display unit 60. The second product location price is different than the first product location price and is perceivable by a second shopper when the second shopper is selecting the product for purchase. The first shopper then proceeds to one of the store checkout stations 42 to pay for the product which the first shopper has selected. The first shopper provides the time-stamp media to the checkout clerk who enters the time information stored on the timestamp media into the checkout computer unit 66. The UPC code on the product is scanned by the product scanner unit 68 and is thereby input into the checkout computer unit 66. The checkout computer unit 66 then transmits the product identification data (UPC code) and the time-stamp data to the store system computer 50 via the signal paths 78 and 80. The store system computer 50 receives the time-stamp data and the product identification data and determines whether the price of the product reflected in the product identification data was changed after the time reflected in the time-stamp data. If the product location price has been changed after the time identified in the time-stamp data, the store system computer 50 transmits a signal to the checkout computer unit 66 via the signal paths 78 and 80 to request from the first shopper a first product checkout price not exceeding the first product location price perceivable by the shopper when the shopper was selecting the product for purchase.

That is, if the price of the product was increased after the first shopper entered the store or selected the product for purchase (depending on whether the store time-stamp unit 126 was located at the store's entrance or adjacent to one of the product pricing units 40) and had his time-stamp media time-stamped by the store time-stamp unit 126, the first product checkout price will reflect the price of the product before the product location price was increased. However, if the price of the product has been decreased after the first shopper had his time-stamp media time stamped by the store time-stamp unit 126, the first product checkout price will be the decreased price.

In the same manner, the physical store system 14 requests from the second shopper a second product checkout price for the purchase of the product, with the second product checkout price not exceeding the second product location price perceivable by the second shopper when the second shopper was selecting the product for purchase.

In the second and third modes of operation, the store time-stamp unit 126 is not utilized to assure that the product checkout price of a product does not exceed the product location price of the product after a change in the price of the product has been made.

In the second mode of operation, the product checkout price requested from the shopper at one of the store checkout stations 42 for the purchase of a product is changed by the store system computer 50 a predetermined time later than the product location price displayed by the product pricing unit 40 located proximate to the product is changed by the store system computer 50. By changing the product checkout price a predetermined time, such as one hour, later than the product location price, this substantially increases the probability that shoppers will not be charged a price at one of the store checkout stations 42 which is greater than the product location price displayed by the respective product pricing unit 40 when the shopper selected the product for purchase.

In a third mode of the present invention, the product location price and the product checkout price are changed simultaneously by the store system computer 50 when the price of the product is decreased, and the product checkout price is changed a predetermined time later than the product location price by the store system computer 50 when the price of the product is increased.

When a product checkout price of a product is decreased, the decreased price can be transmitted to the store product advertising media unit 44 (as discussed above) to notify shoppers of the price reduction via audio or video. Thus, the store system computer 50 automatically changes both the product checkout price and the product advertised price simultaneously.

Owner Control System 12

Figure 6:
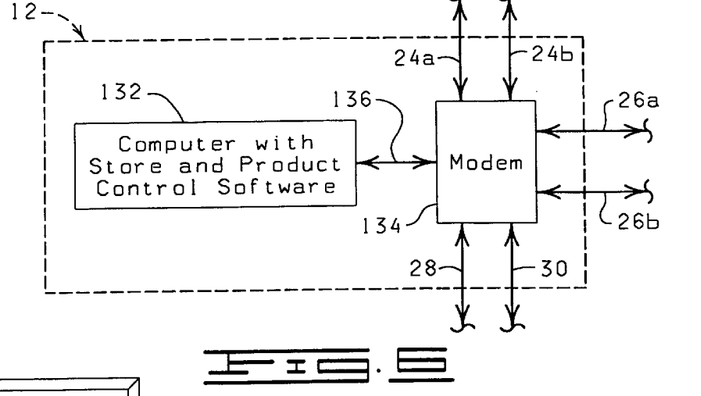
FIG. 6 is a schematic, diagrammatic view of an owner control system constructed in accordance with the present invention.

Referring now to FIG. 1 in combination with FIG. 6, the owner control system 12 is shown in more detail. The owner control system 12 includes an owner control system computer 132 and a modem 134. The owner control system computer 132 communicates with the modem 134 via a signal path 136. The owner control system computer 132 can be a Packard Bell Platinum 2010, for example. The owner control system computer 132 can connect automatically to each of the physical store systems 14 via the signal paths 24*a* and 24*b*, the product supplier systems 16*a* and 16*b* via the signal paths 26*a* and 26*b*, the competition pricing information system 20 via the signal path 30, and the virtual store system 18 via the signal path 28.

It should be noted that the logic executed by the owner control system computer 132 can be incorporated into the store system computer 50 if desired, and/or if the owner only has one physical store. If the logic executed by the owner control system computer 132 is incorporated into the store system computer 50, the owner control system computer 132 can be eliminated.

The owner control system computer 132 includes a plurality of predetermined price change algorithms to send price change codes, including changed prices, and/or price change criteria or instructions, to the physical store systems 14 or the virtual store system 18 based on the competition price data received from the competition pricing information system 20, the pricing and advertising information received from the product supplier systems 16*a* and 16*b*, the sales and inventory data received from the physical store systems 14 and/or the virtual store system 18, and combinations thereof.

In other words, the owner control system computer 132 is adapted to transmit the price change codes to the physical store systems 14*a* and 14*b* and/or the virtual store system 18 to: (1) change the prices at the physical store systems 14*a* and 14*b*, and/or the virtual store system 18; and/or (2) select one or more of the price change algorithms stored on the physical store systems 14*a* and 14*b* and/or the virtual store system 18 to be used thereby in changing the product location and product checkout prices. Different price change codes can be transmitted independently to each of the physical store systems 14, and/or the virtual store system 18 so that the price changes at the physical store systems 14 and/or the virtual store system 18 can be individualized to meet the local supply and/or demand, for example.

For example, the pricing and advertising data received from the product supplier system 16*a* by the owner control system 12 may indicate that a particular product is in short supply. Such pricing and advertising data is then analyzed by at least one of the algorithms stored in the owner control system 12 and a determination may be made to raise the price of the particular product. The owner control system 12 then outputs a price change code to the physical store systems 14 and/or virtual store system 18 to raise the price of the particular product.

As another example, the competition price data received from the competition pricing information system 20 by the owner control system 12 may indicate that a competitor's price on a first product is lower than the price of the first product in the physical store systems 14 and/or the virtual store system 18. Such competition price data is then analyzed by at least one of the algorithms stored in the owner control system 12 and a determination may be made to lower the price of the particular product. The owner control system 12 then outputs a price change code to the physical store systems 14 and/or the virtual store system 18 to lower the price of the particular product. The price change code lowering the price of the particular product can also include instructions to cause the store system computer 50, for example, to output product advertising data to the store product advertising media unit 44 to provide advertising messages, such as coupons, video messages and/or audio messages to accompany the lowering of the price of the product and to thereby notify shoppers of the lowering of the price of the product.

The owner control system 12 receives sales and inventory data from the physical store systems 14 and/or the virtual store system 18. The sales and inventory data is indicative of product purchases, rate of product purchases and the remaining inventory at the physical store systems 14 and/or the virtual store system 18. Based on the sales and inventory data, the owner control system 12 is programmed to automatically output order data to order products from the product suppliers associated with the product supplier systems 16. The order data can be individualized for each of the physical store systems 14 and/or the virtual store system 18 so that the ordered products are shipped from the suppliers to the correct locations.

Virtual Store System 18

Figure 7:
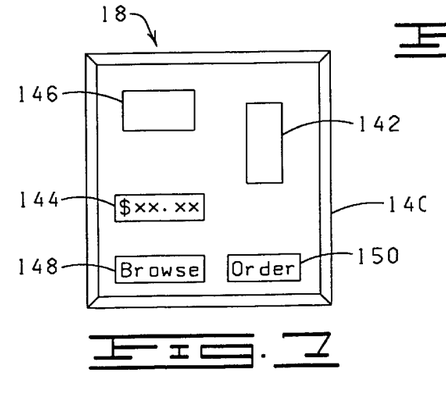
FIG. 7 is an elevational view of a display screen of a virtual store system constructed in accordance with the present invention.

Referring now to FIG. 7, shown therein is a display screen 140 illustrating the virtual store system 18 as perceived by a shopper. It should be noted that the virtual store system 18 and the physical store systems 14 operate identically except as set forth hereinafter. The display screen 140 of the virtual store system 18 is perceivable by the shopper as the shopper is browsing the internet, for example. Displayed on the display screen 140 is at least one product 142, and a product pricing unit 144 displaying the product location price of the particular product 142. Also displayed on the display screen 140 is a store product advertising media unit 146 which operates identically as the store product advertising media unit 44, hereinbefore described with reference to FIG. 2. Various buttons, such as a browse button 148 and an order button 150 are also included on the display screen 140.

In use, the shopper logs on to the virtual store system 18 and the virtual store system 18 stores a time-stamp indicative of the time that the shopper logged on. The shopper then selects the browse button 148 to browse between different products 142. As the shopper browses through the different screens of products 142, the product location price is displayed on the product pricing unit 144, and any advertising specials related to the particular displayed product 142 or other products are transmitted via video and/or audio transmissions by the store product advertising media unit 146 to be perceived by the shopper. As the shopper is browsing through the different screens of products 142, the virtual store system 18 can store a time-stamp indicative of when the shopper first perceived the screen for each individual product 142 which was browsed.

The virtual store system 18 utilizes either the time-stamp recorded when the shopper logs on, or the time-stamp recorded when the shopper views the screens of the individual products 142 to set a product order price based on the time-stamp in the same manner as the product checkout price is determined by the physical store systems 14, as hereinbefore described with reference to FIG. 2. Once the shopper decides to order one of the products 142, the shopper presses the order button 150 and the product location price displayed on the product pricing unit 144 is locked in as the product order price.

Thus, it can be seen that the automated synchronous product pricing and advertising system 10 operates to more efficiently control the prices, and inventory of one or more physical, and or virtual store locations. Government regulations that prices on shelves (product location prices) do not exceed product checkout/order prices are satisfied, and consumer irritation with such price discrepancies is vastly reduced. Labor costs and error costs of manual placard generation and replacement at the product locations are eliminated. Automated management of text, audio and video at the product stations to achieve improvement in media marketing can be implemented and store wide advertising can become a practical matter. In addition, dynamic advertising is possible (e.g. two for one sale or price discount until 5:00 p.m.). The store specials can be accompanied with audio, video and printed materials such as coupons via the store product advertising media unit 44. In addition, dynamic pricing is possible. As discussed before some of the real time economically viable possibilities are:

1. Price increases or decreases depending on station inventory and on predetermined rate of purchase criteria;

2. Price changes to match competitors pricing specials; and

3. Price decreases to reflect purchasing specials, and headquarter specials to achieve end of the month sales projections.

The store product advertising media unit 44, and the automatic changing of prices via the owner control system 12, and/or the store system computer 50 can be implemented at a lower cost as compared to the manual generation of placard displays. The problems associated with time consuming checkout of coupons, and the redeeming of coupons is greatly simplified by the printing, sorting and accumulating of such coupons by the store system computer 50.

Changes may be made in the construction and the operation of the various components, elements and assemblies described herein and changes may be made in the steps or the sequence of steps of the methods described herein, without departing from the spirit and scope of the invention as defined in the following claims.

What is claimed is:

1. An automated product pricing system, comprising:

product pricing unit means for displaying a first product location price indicative of the unit price of a product such that the first product location price is perceivable by a first shopper when the first shopper is selecting the product for purchase;

means for automatically and electronically changing, based on received data analyzed by at least one price change algorithm, the first product location price to a second product location price following the first shopper selecting the product for purchase, the second product location price being different than the first product location price, the second product location price being perceivable by a second shopper when the second shopper is selecting the product for purchase; and means for requesting from the first shopper a first product checkout/order price for the purchase of the product and from the second shopper a second product checkout/order price for the purchase of the product, the first and second product checkout/order prices not exceeding the respective first and second product location prices perceivable by the first and second shoppers when the first and second shoppers were selecting the product for purchase.

2. An automated product pricing system as recited in claim 1, further comprising means for changing the first product checkout/order price to the second product checkout/order price a predetermined time later than when the first product location price is changed to the second product location price.

3. An automated product pricing system as recited in claim 2, further comprising:
a store product advertising media unit constructed to selectively output at least one advertising message in a format perceivable by the second shopper, the advertising message identifying the product and including a product advertised price which is identical to the second product checkout/order price.

4. An automated product pricing system, as defined in claim 3, wherein the second mentioned means includes means for storing the first product checkout/order price and also includes a means for changing the first product checkout/order price to the second product checkout/order price, and wherein the store product advertising media unit outputs the advertising message about simultaneously with the changing of the first product checkout/order price to the second product checkout/order price when the second product checkout/order price is less than the first product checkout/order price.

5. An automated product pricing system as defined in claim 1, wherein received data is selected from the group consisting of competition price data, pricing and advertising information, sales and inventory data, and combinations thereof 6. An automated product pricing system as recited in claim 1, further comprising:
time stamp means for recording a time stamp data indicative of the time at which the first and second product location prices were likely perceivable by the first and second respective shoppers to determine the first product checkout/order price requested from the first shopper and the second product checkout/order price requested from the second shopper.

7. An automated product pricing system as defined in claim 3, wherein the time stamp means records the time at which the first and second shoppers entered the store.

8. An automated product pricing system, comprising:
a plurality of physical store systems, each of the physical store systems comprising:
a product pricing unit constructed to display a product location price indicating the unit price of a product;
a store checkout station constructed to request from a shopper a product checkout price for the purchase of the product;
a store system computer constructed to communicate with the product pricing unit and the store checkout station so as to automatically change the product location price and the product checkout price;
a control system computer located remotely from the physical store systems, the control system computer adapted to selectively communicate price change codes indicative of different prices for the same product to the store system computer of each of the physical store systems whereby the price changes at the physical store systems for the product are capable of being individualized at each physical store system.

9. An automated product pricing system as recited in claim 4, wherein the store system computer of the physical store system further comprises means for changing a first product checkout price to a second product checkout price a predetermined time later than when a first product location price is changed to a second product location price.

10. An automated product pricing system as recited in claim 9, wherein the physical store system further comprises:
a store product advertising media unit constructed to selectively output at least one advertising message in a format perceivable by the shopper, the advertising message identifying the product and including a product advertised price which is identical to the second product checkout price.

11. An automated product pricing system as defined in claim 10, wherein the store product advertising media unit outputs the advertising message about simultaneously with the changing of the first product checkout price to the second product checkout price when the second product checkout price is less than the first product checkout price.

12. An automated product pricing system as defined in claim 8, wherein the control system computer comprises:
means for receiving data selected from the group consisting of competition price data, pricing and advertising information, sales and inventory data, and combinations thereof and for changing a first product location price to a second product location price based on the received data.

13. An automated product pricing system as defined in claim 8, further comprising time stamp means for recording the time at which a shopper entered the physical store, or the shopper viewed a product to determine the product checkout price requested from the shopper.

14. An automated product pricing system as defined in claim 8, further comprising:
a virtual store system including:
a display screen displaying at least one product, and displaying a product location price of the particular product;
a store system computer constructed to communicate with the display means for automatically changing the product location price; and
wherein the control system computer is adapted to selectively communicate price change codes indicative of different prices for the same product to the store system computer of some of the physical store systems and the virtual store system whereby the price changes at the physical store systems and virtual store system for the product are capable of being individualized at each physical store system and the virtual store system.

* * * * *